(12) United States Patent
Asano

(10) Patent No.: US 12,736,660 B2
(45) Date of Patent: Sep. 15, 2026

(54) COMMUNICATION APPARATUS FOR DETERMINING TRANSMISSION DESTINATION BY DISTANCE MEASUREMENT AND DETERMINATION OF PRESENCE OR ABSENCE OF OBSTACLE, CONTROL METHOD THEREFOR, AND SYSTEM

(71) Applicant: CANON KABUSHIKI KAISHA, Tokyo (JP)

(72) Inventor: Kohei Asano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 18/588,384

(22) Filed: Feb. 27, 2024

(65) Prior Publication Data

US 2024/0288571 A1 Aug. 29, 2024

(30) Foreign Application Priority Data

Feb. 28, 2023 (JP) ................................ 2023-029402

(51) Int. Cl.
*G01S 13/76* (2006.01)
*G06F 3/0482* (2013.01)
*G06F 3/12* (2006.01)

(52) U.S. Cl.
CPC .......... *G01S 13/765* (2013.01); *G06F 3/0482* (2013.01); *G06F 3/1204* (2013.01);
(Continued)

(58) Field of Classification Search
CPC .... G01S 13/765; G06F 3/0482; G06F 3/1204; G06F 3/1255; G06F 3/1261; G06F 3/1292
(Continued)

(56) References Cited

U.S. PATENT DOCUMENTS 10,759,389 B2 9/2020 Ledvina et al.
11,921,229 B2 * 3/2024 Ikram .................... G01S 13/34
(Continued)

FOREIGN PATENT DOCUMENTS

CN 112601281 B * 9/2023 ........... H04W 64/00
JP 2022104962 A 7/2022

*Primary Examiner* — Hirdepal Singh
(74) *Attorney, Agent, or Firm* — ROSSI, KIMMS & McDOWELL LLP

(57) ABSTRACT

A communication apparatus capable of determining the presence or absence of an obstacle between devices while achieving highly accurate distance measurement. The communication apparatus communicates with a distance measurement device. The communication apparatus outputs, at a constant interval, an advertisement packet including information to be used for first distance measurement using a signal strength of radio waves, receives, from the distance measurement device, an inquiry wave for performing second distance measurement using a time of arrival of radio waves, stops output of the advertisement packet in accordance with reception of the inquiry wave, and when a predetermined time has elapsed since the reception of the inquiry wave, outputs a response wave to be used for the second distance measurement to the distance measurement device and resumes output of the advertisement packet.

9 Claims, 14 Drawing Sheets

(52) U.S. Cl.
CPC .......... *G06F 3/1255* (2013.01); *G06F 3/1261* (2013.01); *G06F 3/1292* (2013.01)

(58) Field of Classification Search
USPC ....................................................... 455/456.2
See application file for complete search history.

(56) References Cited

U.S. PATENT DOCUMENTS

2018/0060005 A1* 3/2018 Ueno ................. H04N 1/00347
2024/0142994 A1* 5/2024 Ebrahimi Afrouzi ... A47L 11/30
2024/0151839 A1* 5/2024 Yoshihara ............... G01S 11/02
2025/0233741 A1* 7/2025 Liang .................... H04W 12/00
2025/0298140 A1* 9/2025 Kakuya ................... G01S 7/006

* cited by examiner

POLL

RESP frame

Header $T_{Reply}$

ToA $T_{Round}$ $T_{Reply}$

ToA time

Calculate
$ToA = (T_{Round} - T_{Reply}) / 2$

| NUMBER | DEVICE NAME | DISTANCE BY UWB | DISTANCE BY BLE | DIFFERENCE | PRESENCE OR ABSENCE OF OBSTACLE |
|---|---|---|---|---|---|
| 1 | Device-A | 10 | 10 | 0 | NO |
| 2 | Device-B | 5 | 20 | 15 | YES |
| 3 | Device-C | 15 | 40 | 25 | YES |

| NUMBER | DEVICE NAME | DISTANCE BY UWB | DISTANCE BY BLE | DIFFERENCE | PRESENCE OR ABSENCE OF OBSTACLE | RELIABILITY |
|---|---|---|---|---|---|---|
| 1 | Device-A | 10 | 10 | 0 | NO | HIGH |
| 2 | Device-B | 5 | 20 | 15 | YES | HIGH |
| 3 | Device-D | 15 | 40 | 25 | ON HOLD | LOW |

COMMUNICATION APPARATUS FOR DETERMINING TRANSMISSION DESTINATION BY DISTANCE MEASUREMENT AND DETERMINATION OF PRESENCE OR ABSENCE OF OBSTACLE, CONTROL METHOD THEREFOR, AND SYSTEM

BACKGROUND OF THE INVENTION

Field of the Invention

The present invention relates to a communication apparatus that determines a transmission destination by distance measurement and determination of presence or absence of an obstacle, a control method therefor, and a system.

Description of the Related Art

A method for measuring a distance between devices using radio waves of wireless communication has been proposed. An example of a distance measurement method includes distance measurement by Bluetooth low energy (BLE). In the distance measurement by BLE, a distance measurement device receives a radio wave broadcast from a distance measurement target device, compares output signal strength information included in the received radio waves with signal strength of the received radio waves, and calculates a distance between the devices (between the distance measurement device and the distance measurement target device) from a degree of attenuation of the received radio waves. In the distance measurement by BLE, when there is an obstacle such as a glass window between the distance measurement device and the distance measurement target device, the strength of the radio waves received by the distance measurement device through the glass window is attenuated more than the strength of the radio waves output from the distance measurement target device, and thus the distance between the devices cannot be accurately measured.

Another distance measurement method is distance measurement by ultra wideband (UWB). In the distance measurement by UWB, the distance measurement device outputs an inquiry wave to the distance measurement target device, and measures the time required to receive response waves to the inquiry wave, thereby calculating the distance between the devices. In the distance measurement by UWB, even when there is an obstacle between the distance measurement device and the distance measurement target device, the distance measurement device can accurately measure the distance to the distance measurement target device without being affected by the obstacle. As a technique using distance measurement by UWB, a technique disclosed in Japanese Laid-Open Patent Publication (kokai) No. 2022-104962 has been proposed. In Japanese Laid-Open Patent Publication (kokai) No. 2022-104962, a distance measurement device acquires data to be used in distance measurement by UWB from a distance measurement target device by BLE communication, and performs distance measurement by UWB using the acquired data. As a result, the distance between the devices can be measured more accurately than distance measurement by BLE.

SUMMARY OF THE INVENTION

Incidentally, in the distance measurement by UWB, the distance measurement device can accurately measure the distance to the distance measurement target device even if there is an obstacle between the distance measurement device and the distance measurement target device, but cannot determine the presence or absence of an obstacle between the devices. For example, in a case where the distance measurement target device is in another building with one wall in between, the response waves output from the distance measurement target device pass through the wall (obstacle) and reaches the distance measurement device. Therefore, the distance measurement device determines that the distance measurement target device exists in the immediate vicinity, based on the response waves. As a result, in the related art, when the accuracy of distance measurement is increased, it is not possible to determine the presence or absence of an obstacle between devices.

The present invention provides a communication apparatus, a control method for the communication apparatus, and a system, capable of determining the presence or absence of an obstacle between devices while achieving highly accurate distance measurement.

Accordingly, the present invention provides a communication apparatus that communicates with a distance measurement device, the communication apparatus comprising at least one memory that stores a set of instructions, and at least one processor that executes the instructions, the instructions, when being executed, causing the communication apparatus to output, at a constant interval, an advertisement packet including information to be used for first distance measurement using a signal strength of radio waves, receive, from the distance measurement device, an inquiry wave for performing second distance measurement using a time of arrival of radio waves, stop output of the advertisement packet in accordance with reception of the inquiry wave, and when a predetermined time has elapsed since the reception of the inquiry wave, output a response wave to be used for the second distance measurement to the distance measurement device and resume output of the advertisement packet.

According to the present invention, it is possible to determine the presence or absence of an obstacle between devices while achieving highly accurate distance measurement.

Further features of the present invention will become apparent from the following description of exemplary embodiments with reference to the attached drawings.

BRIEF DESCRIPTION OF THE DRAWINGS

FIG. 4 is a diagram for explaining distance measurement by UWB in the distance measurement device of FIG. 1.

DESCRIPTION OF THE EMBODIMENTS

The present invention will now be described in detail below with reference to the accompanying drawings showing embodiments thereof.

Figure 1:
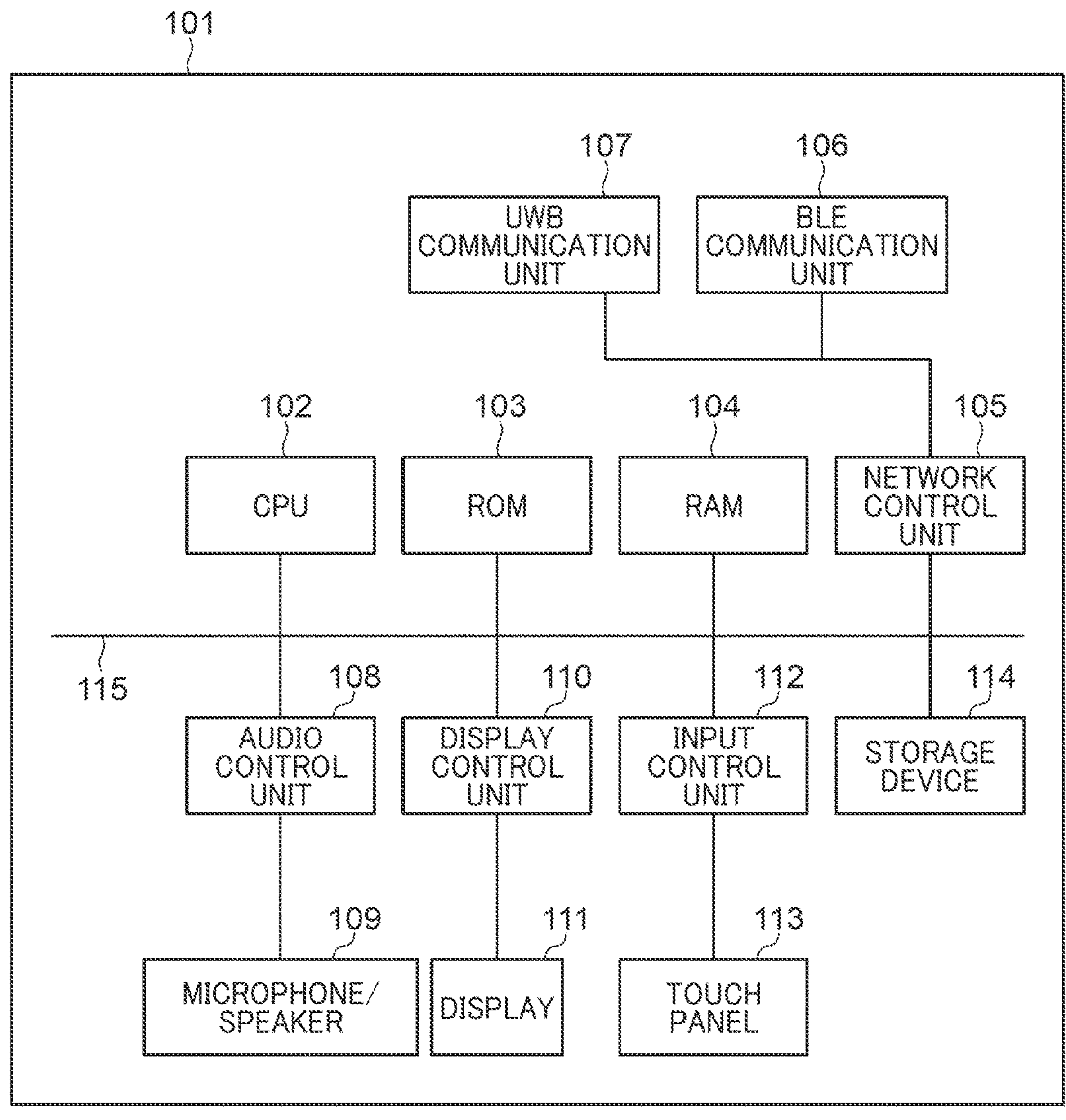
FIG. 1 is a block diagram schematically showing a hardware configuration of a distance measurement device as a communication apparatus according to the present embodiment.

FIG. 1 is a block diagram schematically showing a hardware configuration of a distance measurement device 101 as a communication apparatus according to the present embodiment. The distance measurement device 101 is a device having a distance measurement function of measuring a distance to the distance measurement target device 201 by wireless communication, and is, for example, a mobile terminal such as a smartphone or a tablet.

In FIG. 1, the distance measurement device 101 includes a CPU 102, a ROM 103, a RAM 104, a network control unit 105, an audio control unit 108, a display control unit 110, an input control unit 112, and a storage device 114, which are connected to one another via a system bus 115. Furthermore, the distance measurement device 101 includes a BLE communication unit 106, a UWB communication unit 107, a microphone/speaker 109, a display 111, and a touch panel 113.

The CPU 102 executes a program stored in the ROM 103 to perform various controls. The ROM 103 stores programs and the like. The RAM 104 is used as a work memory for the CPU 102. In addition, the RAM 104 is used as a memory for temporarily storing data. The BLE communication unit 106 and the UWB communication unit 107 are connected to the network control unit 105. The network control unit 105 controls the BLE communication unit 106 and the UWB communication unit 107.

The BLE communication unit 106 is a communication unit for forming a wireless personal area network (WPAN) with a peripheral computer device whom wireless signals by the BLE (BLE communication method) reach mutually (that is, for forming the WPAN between the distance measurement device 101 and a computer device existing in the vicinity that exchanges wireless signals with the distance measurement device 101 using BLE). The BLE communication unit 106 measures the distance to the distance measurement target device 201 using the received signal strength (received signal strength indicator (RSSI)) of the radio waves. It should be noted that hereinafter, a distance measurement method for measuring the distance to the distance measurement target device 201 using the received signal strength of the radio waves is referred to as "distance measurement by BLE". Details of the distance measurement by BLE will be described below.

The UWB communication unit 107 is a communication unit for forming a WPAN, for performing distance measurement and data communication, with a peripheral computer device whom wireless signals by UWB (UWB communication method) reach mutually (that is, for forming the WPAN between the distance measurement device 101 and a computer device existing in the vicinity that exchanges wireless signals with the distance measurement device 101 by UWB). The UWB communication unit 107 measures the distance to the distance measurement target device 201 using a time of arrival of the radio waves. It should be noted that hereinafter, a distance measurement method for measuring the distance to the distance measurement target device 201 using the time of arrival of the radio waves is referred to as "distance measurement by UWB". Details of the distance measurement by UWB will be described below. It should be noted that in the present embodiment, in the BLE communication and the UWB communication, the network control unit 105 can independently control the BLE communication unit 106 and the UWB communication unit 107 without receiving an instruction from the CPU 102 in order to achieve the purpose of the communication.

The microphone/speaker 109 is connected to the audio control unit 108. The audio control unit 108 controls the microphone/speaker 109 in accordance with an instruction from the CPU 102. For example, the audio control unit 108 controls input and output of audio data by the microphone/speaker 109 during a call of the user. The display 111 is connected to the display control unit 110. The display control unit 110 causes the display 111 to display various types of information in accordance with an instruction from the CPU 102. The touch panel 113 is connected to the input control unit 112. The input control unit 112 outputs information input by the user on the touch panel 113 to the CPU 102. The storage device 114 is a non-volatile storage device, and stores an operation mode setting value, an operation log, and the like, which need to be held even after the restart of the distance measurement device 101.

Figure 2:
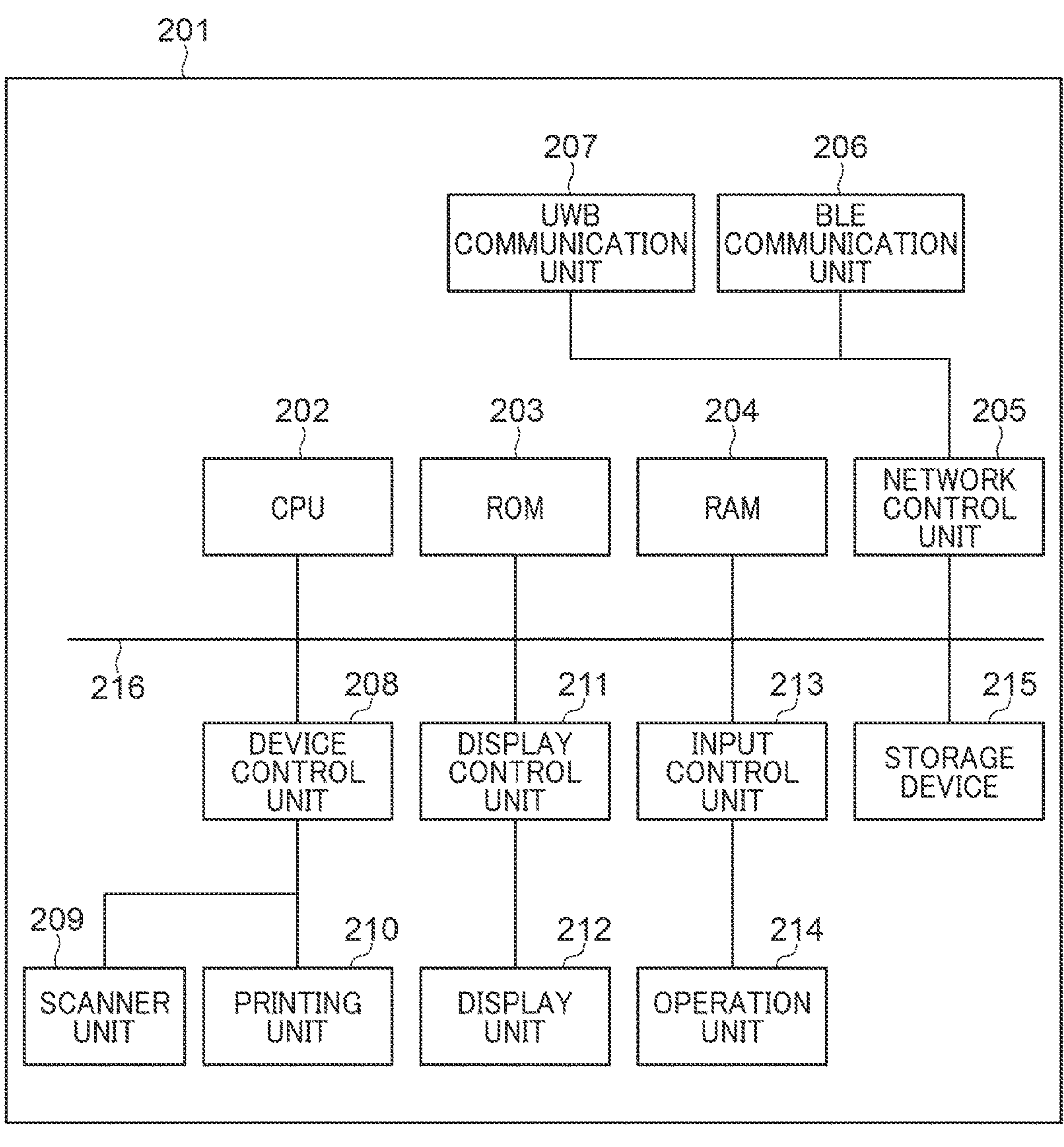
FIG. 2 is a block diagram schematically showing a hardware configuration of a distance measurement target device as a communication apparatus according to the present embodiment.

FIG. 2 is a block diagram schematically showing a hardware configuration of a distance measurement target device 201 as a communication apparatus according to the present embodiment. The distance measurement target device 201 is a device having a function of transmitting information necessary for distance measurement to the distance measurement device 101 by wireless communication, and is, for example, an image forming apparatus such as a single function printer or a multi-function printer (multi-function peripheral).

In FIG. 2, the distance measurement target device 201 includes a CPU 202, a ROM 203, a RAM 204, a network control unit 205, a device control unit 208, a display control unit 211, an input control unit 213, and a storage device 215, which are connected to one another via a system bus 216. Furthermore, the distance measurement target device 201 includes a BLE communication unit 206, a UWB communication unit 207, a scanner unit 209, a printing unit 210, a display unit 212, and an operation unit 214.

The CPU 202 executes a program stored in the ROM 203 to perform various controls. The ROM 203 stores programs and the like. The RAM 204 is used as a work memory for the CPU 202. In addition, the RAM 204 is used as a memory for temporarily storing data. The BLE communication unit 206 and the UWB communication unit 207 are connected to the network control unit 205. The network control unit 205 controls the BLE communication unit 206 and the UWB communication unit 207.

The BLE communication unit 206 is a communication unit for forming a WPAN with a peripheral computer device whom wireless signals by the BLE reach mutually (that is, for forming the WPAN between the distance measurement target device 201 and a computer device existing in the vicinity that exchanges wireless signals with the distance measurement target device 201 using BLE). The UWB communication unit 207 is a communication unit for forming a WPAN, for performing distance measurement and data communication, with a peripheral computer device whom wireless signals by UWB reach mutually (that is, for forming the WPAN between the distance measurement target device 201 and a computer device existing in the vicinity that exchanges wireless signals with the distance measurement target device 201 by UWB). It should be noted that in the present embodiment, in the BLE communication and the UWB communication, the network control unit 205 can independently control the BLE communication unit 206 and the UWB communication unit 207 without receiving an instruction from the CPU 202 in order to achieve the purpose of the communication.

The scanner unit 209 and the printing unit 210 are connected to the device control unit 208. The device control unit 208 controls the scanner unit 209 and the printing unit 210 in accordance with an instruction from the CPU 202. The scanner unit 209 reads a document placed on a platen (not shown) and generates image data of an image on the document. The printing unit 210 forms an image on a sheet on the basis of print data received from the distance measurement device 101 or image data generated by the scanner unit 209.

The display unit 212 is connected to the display control unit 211. The display control unit 211 causes the display unit 212 to display various types of information, in accordance with an instruction from the CPU 202. The operation unit 214 including an operation button such as a print button is connected to the input control unit 213. The input control unit 213 outputs information indicating contents of the operation of the user on the operation unit 214, to the CPU 202. Note that, in the present embodiment, a device having both functions of the display unit 212 and the operation unit 214, such as a touch panel, may be used. The storage device 215 is a non-volatile storage device, and stores an operation mode setting value, an operation log, and the like, which need to be held even after the restart of the distance measurement target device 201.

Next, distance measurement by the distance measurement device 101 will be described.

Figure 3:
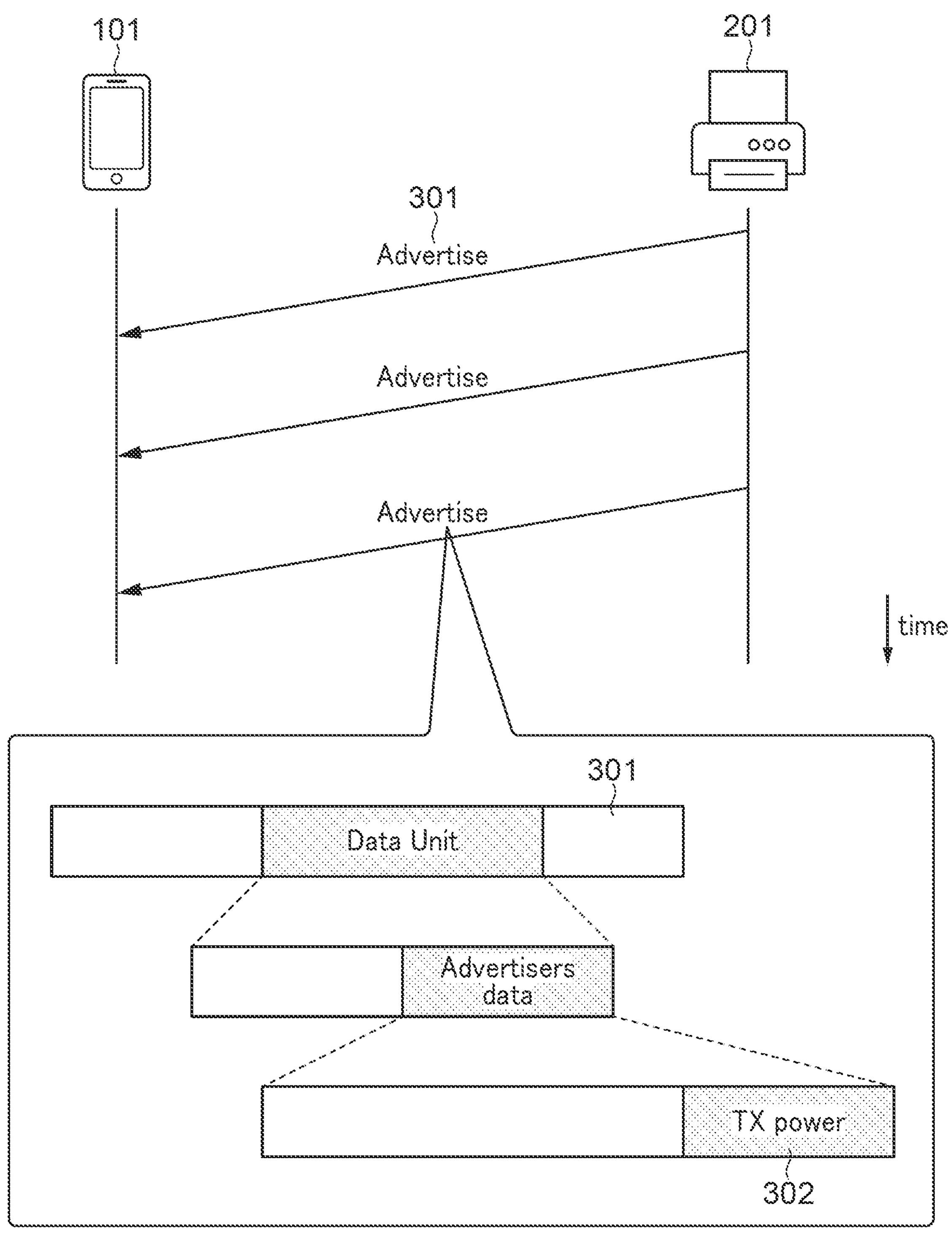
FIG. 3 is a diagram for explaining distance measurement by BLE in the distance measurement device in FIG. 1.

FIG. 3 is a diagram for explaining distance measurement by BLE in the distance measurement device 101 in FIG. 1. In the distance measurement by BLE, the BLE communication unit 106 measures the distance to the distance measurement target device 201 using the received signal strength of the radio wave as described above. A distance measurement method using received signal strength of radio waves is defined by Bluetooth 4.0 or the like.

As shown in FIG. 3, the distance measurement target device 201 outputs an advertisement packet 301 at regular intervals. The advertisement packet 301 includes information indicating the distance measurement target device 201 and information to be used for distance measurement by BLE. The information to be used for distance measurement by BLE is, for example, reference distance information and transmission output signal strength information (indicated as "TX power" in FIG. 3) 302 indicating the strength of the radio wave output from the distance measurement target device 201. The distance measurement device 101 measures the distance to the distance measurement target device 201 on the basis of the radio wave strength of the advertisement packet 301 received from the distance measurement target device 201, and the reference distance information and the transmission output signal strength information 302 included in the received advertisement packet 301.

The advertisement packet 301 reaches the distance measurement device 101 from the distance measurement target device 201 while causing reflection by a wall and/or a floor, attenuation and/or diffraction by a window, a wall, and/or the like, interference with another advertisement packet output earlier, and/or the like. That is, multipath fading generally occurs when the advertisement packet 301 reaches the distance measurement device 101. On the other hand, the distance measurement device 101 uses only the maximum value of the received signal strength in the measurement of the received signal strength. In an environment where the multipath fading occurs, there is a place where the signal strength of a reflected wave or an interference wave is higher than that of a direct wave. Therefore, in a case where the distance measurement device 101 is in such a place, the received signal strength becomes larger than the true value thereof, that is, the received signal strength of the direct wave. As a result, it is determined that as if the distance measurement target device 201 is closer than the actual position, and the distance measurement accuracy decreases.

As described above, in the distance measurement by the BLE communication unit 106, if there is an interfering object such as a window or a wall around the distance measurement device 101 and/or the distance measurement target device 201, the distance measurement result is affected.

Figure 4:
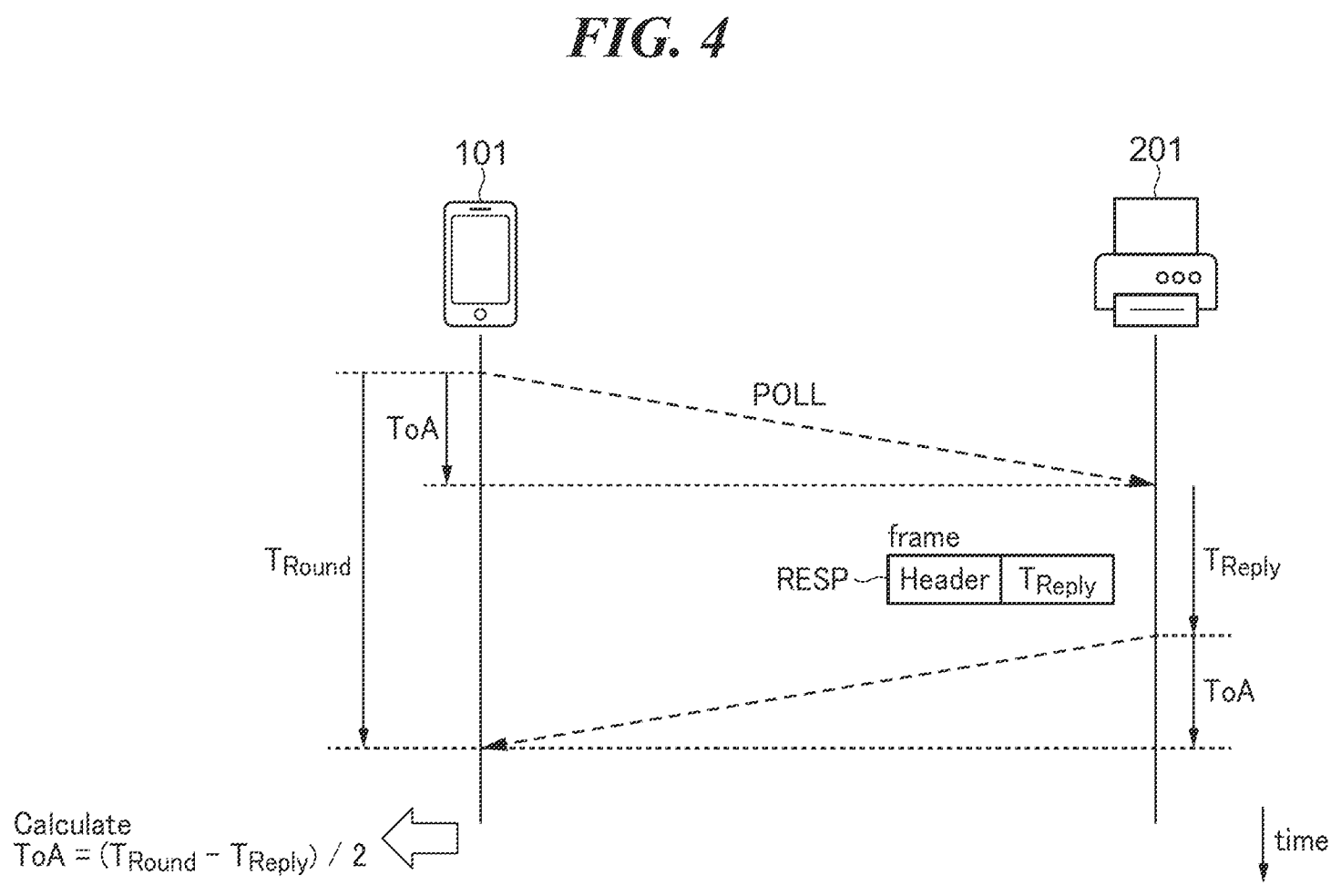

FIG. 4 is a diagram for explaining distance measurement by UWB in the distance measurement device 101 in FIG. 1. In the distance measurement by UWB, the UWB communication unit 107 measures the distance to the distance measurement target device 201 using the time of arrival of the radio wave as described above. A distance measurement method using a time of arrival of radio wave is defined by UWB and is called two-way ranging (TWR).

As shown in FIG. 4, the distance measurement device 101 transmits a inquiry wave (hereinafter referred to as a "POLL frame"), to the distance measurement target device 201. Upon receiving the POLL frame, the distance measurement target device 201 returns a response wave (hereinafter referred to as a "RESP frame"). A time of arrival (hereinafter referred to as "ToA") for the POLL frame and the RESP frame are determined according to the distance between the distance measurement device 101 and the distance measurement target device 201. In addition, it takes a required response time (hereinafter referred to as "$T_{Reply}$") for the distance measurement target device 201 to return the RESP frame after receiving the POLL frame. The distance measurement target device 201 returns a RESP frame including required response time information indicating the time $T_{Reply}$, to the distance measurement device 101.

The distance measurement device 101 measures a time (hereinafter referred to as "$T_{Round}$") from the transmission of the POLL frame to the reception of the RESP frame. The distance measurement device 101 substitutes the measured time $T_{Round}$ and the time $T_{Reply}$ indicated by the required response time information included in the received RESP frame into the following Formula (1) to calculate ToA.

$$T_{Round} = ToA + ToA + T_{Reply} \quad (1)$$

The transmission speed of the electromagnetic wave is the speed of light. The distance measurement device 101 calculates the distance to the distance measurement target device 201 using the speed of light and the ToA obtained by Formula (1).

In the distance measurement by the UWB communication unit 107, regardless of the presence or absence of a reflected wave or an interference wave, information on a response wave received earliest in time is used for calculation. Since the radio wave transmits through a non-dielectric material, glass, or the like, in the distance measurement by UWB, even if these interfering objects exist between the distance measurement device 101 and the distance measurement target device 201, the distance to the distance measurement target device 201 can be accurately measured without being affected by these interference objects.

Meanwhile, the distance measurement device 101 has a function of transmitting print data to an image forming apparatus near the distance measurement device 101. For example, the distance measurement device 101 measures, by distance measurement by the UWB described above, a distance to an image forming apparatus in a communicable range by the UWB communication unit 107. The distance measurement device 101 causes the display 111 to display image forming apparatuses in a communicable range by the UWB communication unit 107 as transmission destination candidates of print data in an ascending order of distance to the distance measurement device 101 (in the order of proximity to the distance measurement device 101). The distance measurement device 101 transmits the print data to the image forming apparatus selected by the user from among the transmission destination candidates.

Figure 5:
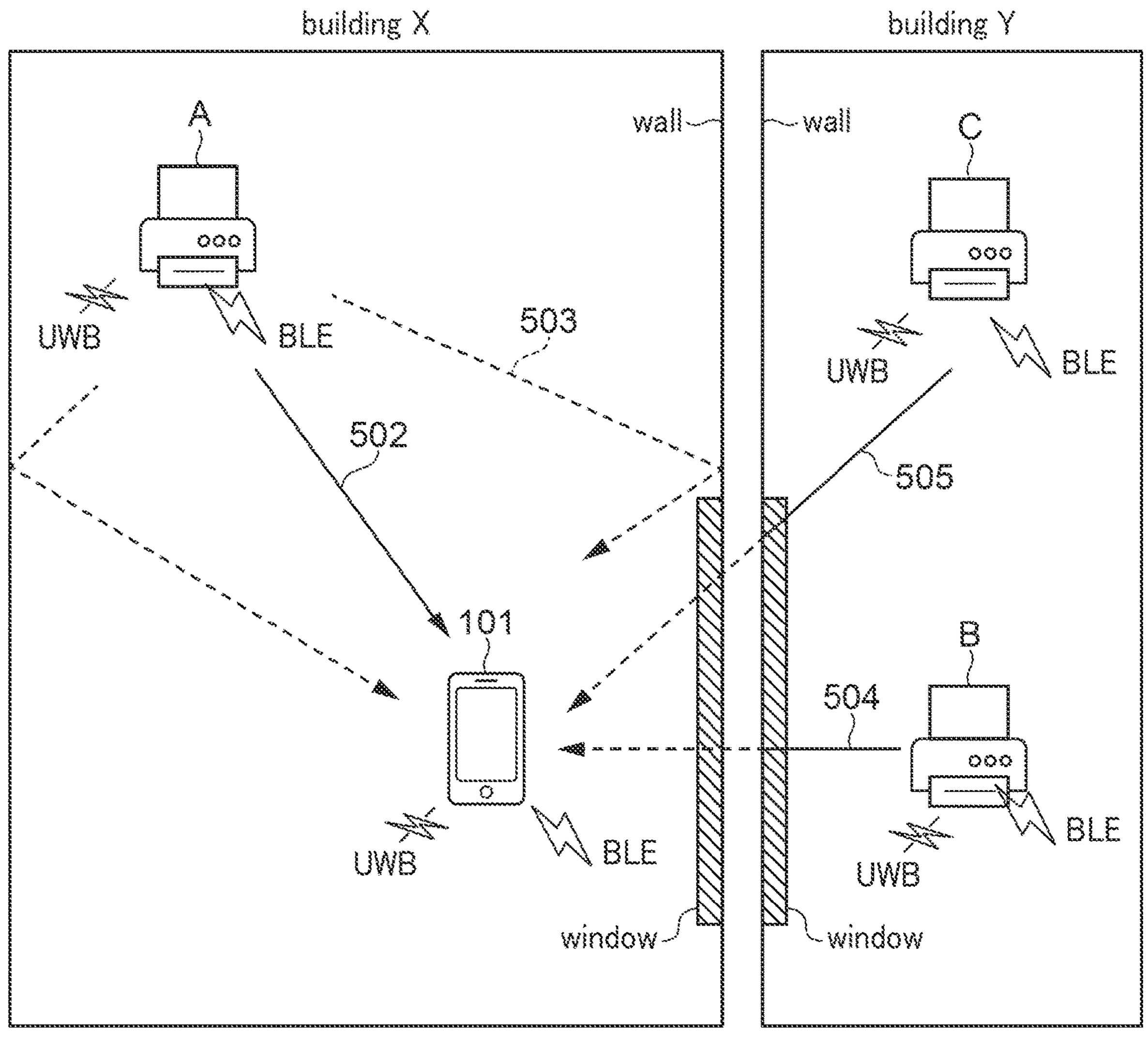
FIG. 5 is a diagram showing an arrangement example of a distance measurement device and a distance measurement target device.

For example, as shown in FIG. 5, an image forming apparatus A, an image forming apparatus B, and an image forming apparatus C are present within a communicable range by the UWB communication unit 107. In this case, the distance measurement device 101 measures a distance to the image forming apparatus A, a distance to the image forming apparatus B, and a distance to the image forming apparatus C, by distance measurement by UWB. Note that it is assumed that the image forming apparatus A, the image forming apparatus B, and the image forming apparatus C each has function s and configurations similar to those of the distance measurement target device 201.

In FIG. 5, the image forming apparatus A is present on the same floor of the same building X as the distance measurement device 101. The image forming apparatus B and the image forming apparatus C are present on a floor of the building Y adjacent to the building X. There are two glass windows between the distance measurement device 101 and the image forming apparatus B and between the distance measurement device 101 and the image forming apparatus C.

For example, radio waves received by the distance measurement device 101 from the image forming apparatus A include a direct wave 502 that directly reaches the distance measurement device 101 and a reflected wave 503 that is reflected by a wall of the building X and reaches the distance measurement device 101. In addition, each of a radio wave 504 received by the distance measurement device 101 from the image forming apparatus B and a radio wave 505 received by the distance measurement device 101 from the image forming apparatus C is a radio wave attenuated by the glass windows.

Figure 6:
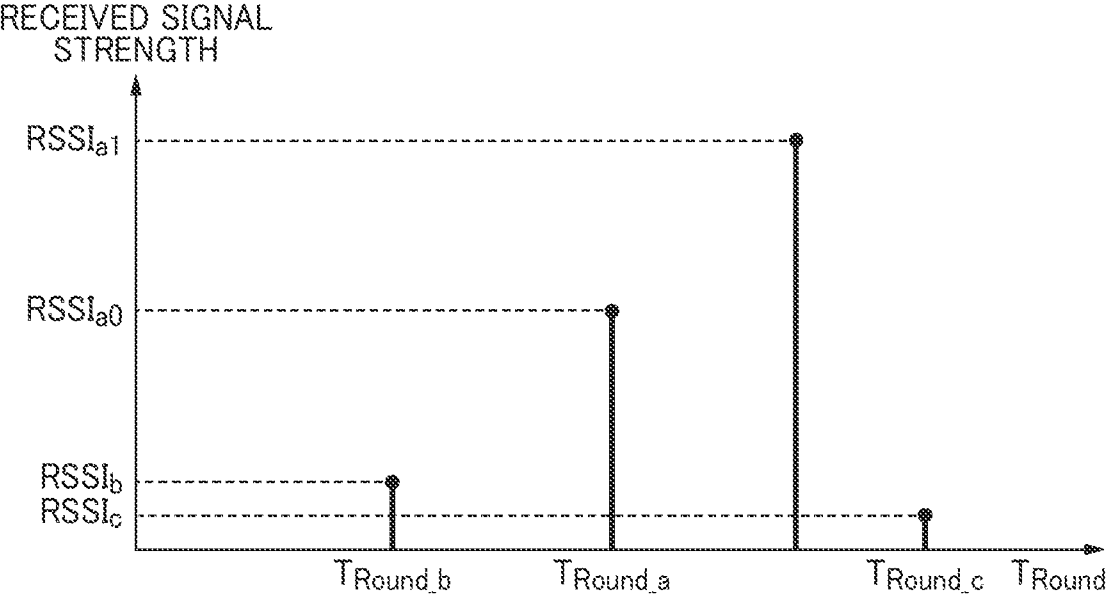
FIG. 6 is a diagram showing received signal strengths of radio waves received from image forming apparatuses by the distance measurement device in FIG. 1.

FIG. 6 is a diagram showing received signal strengths of radio waves received by the distance measurement device 101 in FIG. 1 from the image forming apparatus A, the image forming apparatus B, and the image forming apparatus C. In FIG. 6, a horizontal axis represents time $T_{Round}$, and a vertical axis represents received signal strength.

In FIG. 6, the time $T_{Round}$ for the direct wave 502 received by the distance measurement device 101 from the image forming apparatus A is $T_{Round\_a}$, and the received signal strength of the received direct wave 502 is $RSSI_{a0}$. The time $T_{Round}$ for the radio wave 504 received by the distance measurement device 101 from the image forming apparatus B is $T_{Round}$ b, and the received signal strength of the received radio wave 504 is $RSSI_b$. The time $T_{Round}$ for the radio wave 505 received by the distance measurement device 101 from the image forming apparatus C is $T_{Round\text{-}c}$, and the received signal strength of the received radio wave 505 is $RSSI_c$. It should be noted that since only the frame that is received earliest is used in the distance measurement by UWB as described above, the time $T_{Round}$ for the reflected wave 503 received after the reception of the direct wave 502 among the radio waves received from the image forming apparatus A by the distance measurement device 101 is not calculated.

Figure 7:
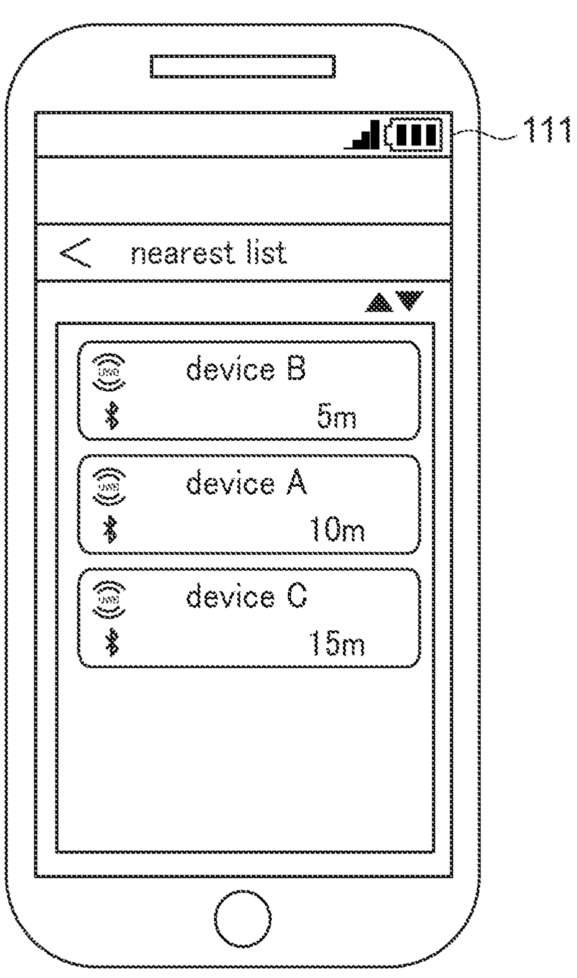
FIG. 7 is a diagram showing an example of transmission destination candidates displayed on a display of FIG. 1.

The distance measurement device 101 determines that the image forming apparatus for which the calculated time $T_{Round}$ is smaller, the closer the distance to the distance measurement device 101. For example, in a case where the time $T_{Round}$ is calculated as shown in FIG. 6, the distance measurement device 101 determines that the distance from the distance measurement device 101 is shorter in the order of: the image forming apparatus B, the image forming apparatus A, and the image forming apparatus C, and displays the transmission destination candidates on the display 111 as shown in FIG. 7.

Here, the image forming apparatus B is a device present in the building Y adjacent to the building X in which the distance measurement device 101 is present. If such an image forming apparatus is designated as the transmission destination of the print data, the user needs to go to the adjacent building Y to pick up the printed matter, which is very inconvenient. In order to avoid such a situation, a technique for determining the presence or absence of an obstacle between devices while increasing the accuracy of distance measurement is desired.

To cope with this, in the present embodiment, highly accurate distance measurement is performed by distance measurement by UWB, and the presence or absence of an obstacle between the distance measurement device 101 and the distance measurement target device 201 is determined on the basis of the distance measured by distance measurement by UWB and the distance measured by distance measurement by BLE.

Figure 8:
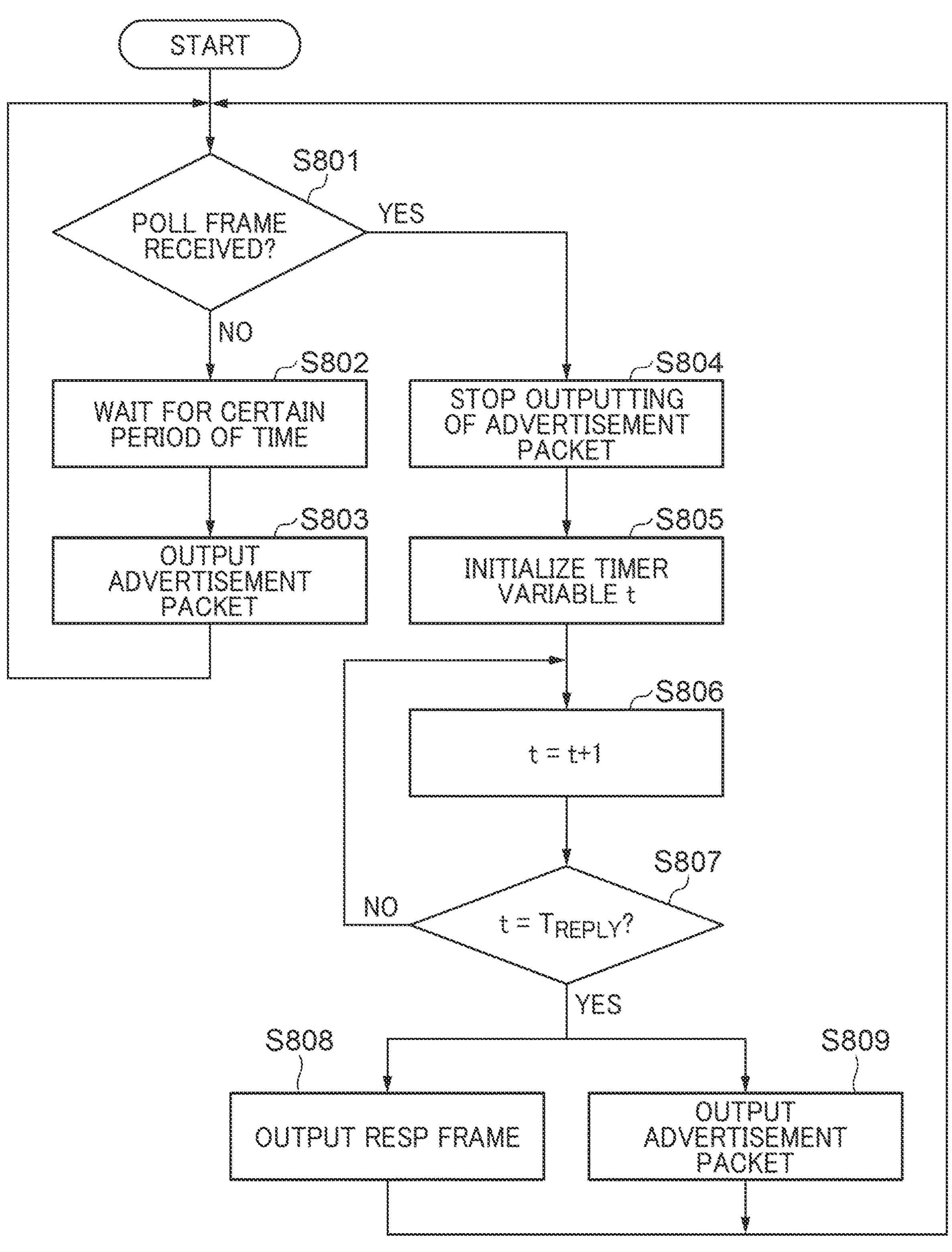
FIG. 8 is a flowchart showing a procedure of RESP frame transmission control processing executed by the distance measurement target device in FIG. 2.

FIG. 8 is a flowchart showing a procedure of RESP frame transmission control processing executed by the distance measurement target device 201 in FIG. 2. The RESP frame transmission control processing in FIG. 8 is realized by the CPU 202 executing a program stored in the ROM 203 or the like.

In FIG. 8, first, the CPU 202 monitors the reception of the POLL frame and determines whether or not the POLL frame has been received (step S801). In a case where it is determined in step S801 that the POLL frame has not been received, the CPU 202 waits for a certain period of time (step S802). Next, the CPU 202 outputs the advertisement packet 301 (step S803). Thereafter, the RESP frame transmission control processing returns to step S801. As described above, in the present embodiment, the distance measurement target device 201 outputs the advertisement packet 301 at regular intervals until receiving the POLL frame from the distance measurement device 101.

In a case where it is determined in step S801 that the POLL frame has been received, the CPU 202 stops outputting the advertisement packet 301 (step S804). Next, the CPU 202 initializes a timer variable t prepared in the RAM 204 to "0" (step S805). The timer variable t is a variable used for measuring the time $T_{Reply}$ for the distance measurement target device 201. Next, the CPU 202 increments the timer variable t correspondingly to the lapse of time (step S806). Next, the CPU 202 determines whether or not the timer variable t matches the predetermined time $T_{REPLY}$ set in advance in the distance measurement target device 201 (step S807).

In a case where it is determined in step S807 that the timer variable t does not match the time $T_{REPLY}$, the RESP frame transmission control processing returns to step S806. As described above, in the present embodiment, the CPU 202 increments the timer variable t until the timer variable t matches the predetermined time $T_{REPLY}$ and waits for the elapse of the time $T_{REPLY}$.

In a case where it is determined in step S807 that the timer variable t matches the time $T_{REPLY}$, the CPU 202 outputs the RESP frame to the transmission destination of the POLL frame, specifically, the distance measurement device 101 (step S808). Further, the CPU 202 outputs the advertisement packet 301 substantially simultaneously with the output in step S808 (step S809). Thereafter, the RESP frame transmission control processing returns to step S801.

For example, as shown in FIG. 5, in a case where the image forming apparatus A, the image forming apparatus B, and the image forming apparatus C are present within a communicable range with the distance measurement device 101, each of the image forming apparatus A, the image forming apparatus B, and the image forming apparatus C performs RESP frame transmission control processing.

Figure 9:
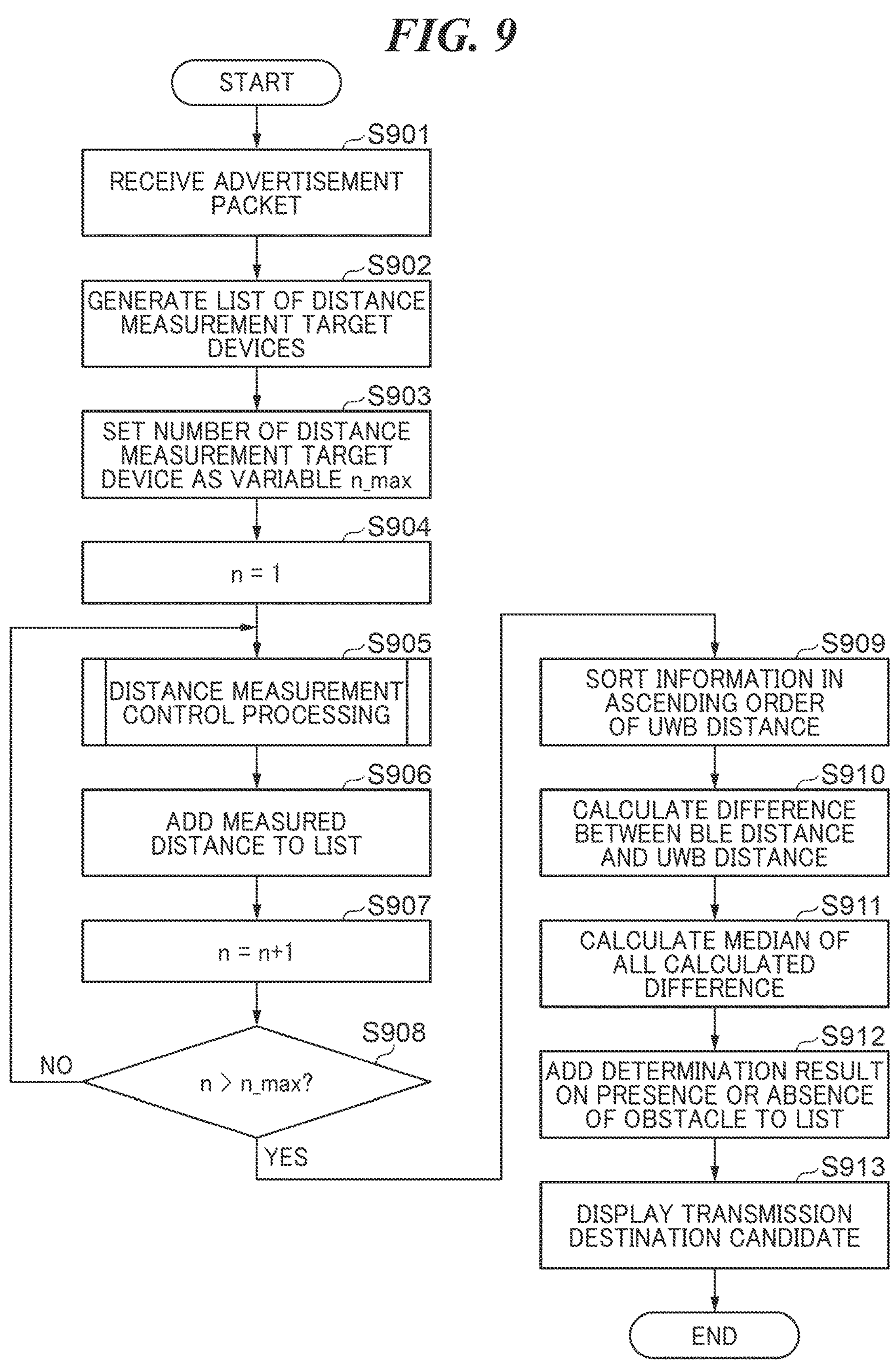
FIG. 9 is a flowchart showing a procedure of transmission destination candidate display processing executed by the distance measurement device in FIG. 1.

FIG. 9 is a flowchart showing a procedure of transmission destination candidate display processing executed by the distance measurement device 101 in FIG. 1. The control processing of FIG. 9 is realized by the CPU 102 executing a program stored in the ROM 103. As an example, as shown in FIG. 5, the transmission destination candidate display processing will be described assuming that the image forming apparatus A, the image forming apparatus B, and the image forming apparatus C are present within a communicable range by the BLE communication unit 106. In this case, an advertisement packet 301 is transmitted from each of the image forming apparatus A, the image forming apparatus B, and the image forming apparatus C.

In FIG. 9, first, the CPU 102 receives an advertisement packet 301 from each of the image forming apparatus A, the image forming apparatus B, and the image forming apparatus C which are the distance measurement target devices 201 (step S901).

Next, the CPU 102 generates a list of the distance measurement target devices 201 (step S902). In step S902, a list indicating the image forming apparatus A, the image forming apparatus B, and the image forming apparatus C, which are transmission sources of the advertisement packet 301, is generated. In the list of the distance measurement target devices 201, the distance measurement target devices 201 are assigned serial numbers. Next, the CPU 102 sets the number of the distance measurement target devices 201 included in the list generated in step S902, as a predetermined value "variable n_max" related to the variable (step S903). Next, the CPU 102 sets a variable n for specifying one distance measurement target device 201 from the list of the distance measurement target devices 201 to "1" (step S904). Next, the CPU 102 performs distance measurement control processing (FIG. 11) on the distance measurement target device 201 corresponding to the variable n (step S905). In step S905, a distance (hereinafter referred to as "UWB distance") measured by distance measurement by UWB and a distance (hereinafter referred to as "BLE distance") measured by distance measurement by BLE are obtained.

Next, the CPU 102 adds the UWB distance and the BLE distance measured in step S905 to the list of the distance measurement target devices 201 (step S906). Next, the CPU 102 increments the variable n (step S907). Next, the CPU 102 determines whether or not the variable n is larger than the variable n_max (step S908).

In a case where it is determined in step S908 that the variable n is not larger than the variable n_max, the transmission destination candidate display processing returns to step S905. As described above, in the present embodiment, the UWB distance and the BLE distance are obtained for all the distance measurement target devices 201 included in the list of the distance measurement target devices 201, and the obtained UWB distance and the obtained BLE distance are added to the list of the distance measurement target devices 201.

In a case where it is determined in step S908 that the variable n is larger than the variable n_max, the CPU 102 sorts the information described in the list of the distance measurement target devices 201 in an ascending order of the UWB distance (step S909).

Next, the CPU 102 calculates the difference between the BLE distance and the UWB distance for each distance measurement target device 201 (step S910). The CPU 102 adds the calculated difference to the list of the distance measurement target devices 201. Next, the CPU 102 calculates a median of all the differences calculated in step S910 (step S911). For example, in a case where the difference corresponding to the image forming apparatus A is calculated as "0", the difference corresponding to the image forming apparatus B is calculated as "15", and the difference corresponding to the image forming apparatus C is calculated as "25" in step S910, "15" is calculated as the median thereof in step S911.

Next, the CPU 102 adds the determination result on the presence or absence of an obstacle to the list of the distance measurement target devices 201 (step S912). Here, the signal strength of the direct wave is attenuated by the obstacle existing in the propagation path. Therefore, in a case of a distance measurement target device 201 for which difference between the BLE distance and the UWB distance calculated in step S910 is relatively large, it can be determined that there is an obstacle between the distance measurement device 101 and the distance measurement target device 201. By using this fact, in the present embodiment, the determination result of the presence or absence of an obstacle is added to the list of the distance measurement target device 201 as follows. For example, for the distance measurement target device 201 (e.g., the image forming apparatus B, C) for which the difference calculated in step S910 is equal to or larger than the median calculated in step S911, "YES" indicating that there is an obstacle between the distance measurement device 101 and the distance measurement target device 201 is added to the list. On the other hand, for the distance measurement target device 201 (e.g., the image forming apparatus A) for which the difference calculated in step S910 is less than the median calculated in step S911, "NO" indicating that there is no obstacle between the distance measurement device 101 and the distance measurement target device 201 is added to the list. In this way, a list of the distance measurement target devices 201 shown in FIG. 10A is obtained.

Figures 10A, 10B:
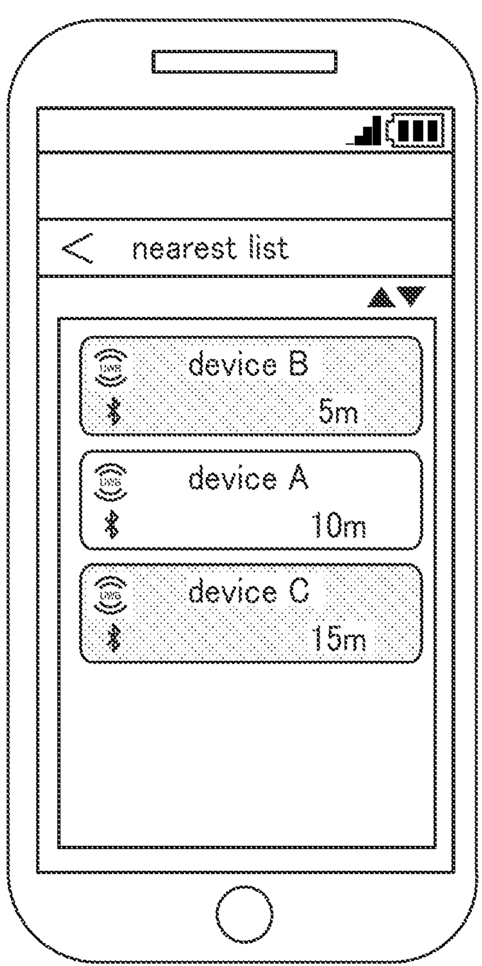
FIGS. 10A and 10B are diagrams for explaining processing of steps S912 and S913 in FIG. 9.

Next, the CPU 102 causes the display 111 to display the transmission destination candidates on the basis of the list of the distance measurement target devices 201 in FIG. 10A (step S913). In step S913, for example, the distance measurement target device 201 is displayed on the display 111 in an ascending order of distance to the distance measurement device 101 (in the order of proximity to the distance measurement device 101), and the distance measurement target device 201 determined to have an obstacle between the distance measurement device 101 and the distance measurement target device 201 is displayed on the display 111 in an unselectable manner. Specifically, as shown in FIG. 10B, the image forming apparatuses B and C, determined to have an obstacle on the way to the distance measurement device 101, are displayed in gray out so as not to be selectable. As a result, it is possible to perform control such that an image forming apparatus present in a place to which the user cannot immediately move, such as the image forming apparatuses B and C present in the building Y adjacent to the building X where the distance measurement device 101 is present, is not selected by the user as the transmission destination. Thereafter, the transmission destination candidate display processing ends.

Figure 11:
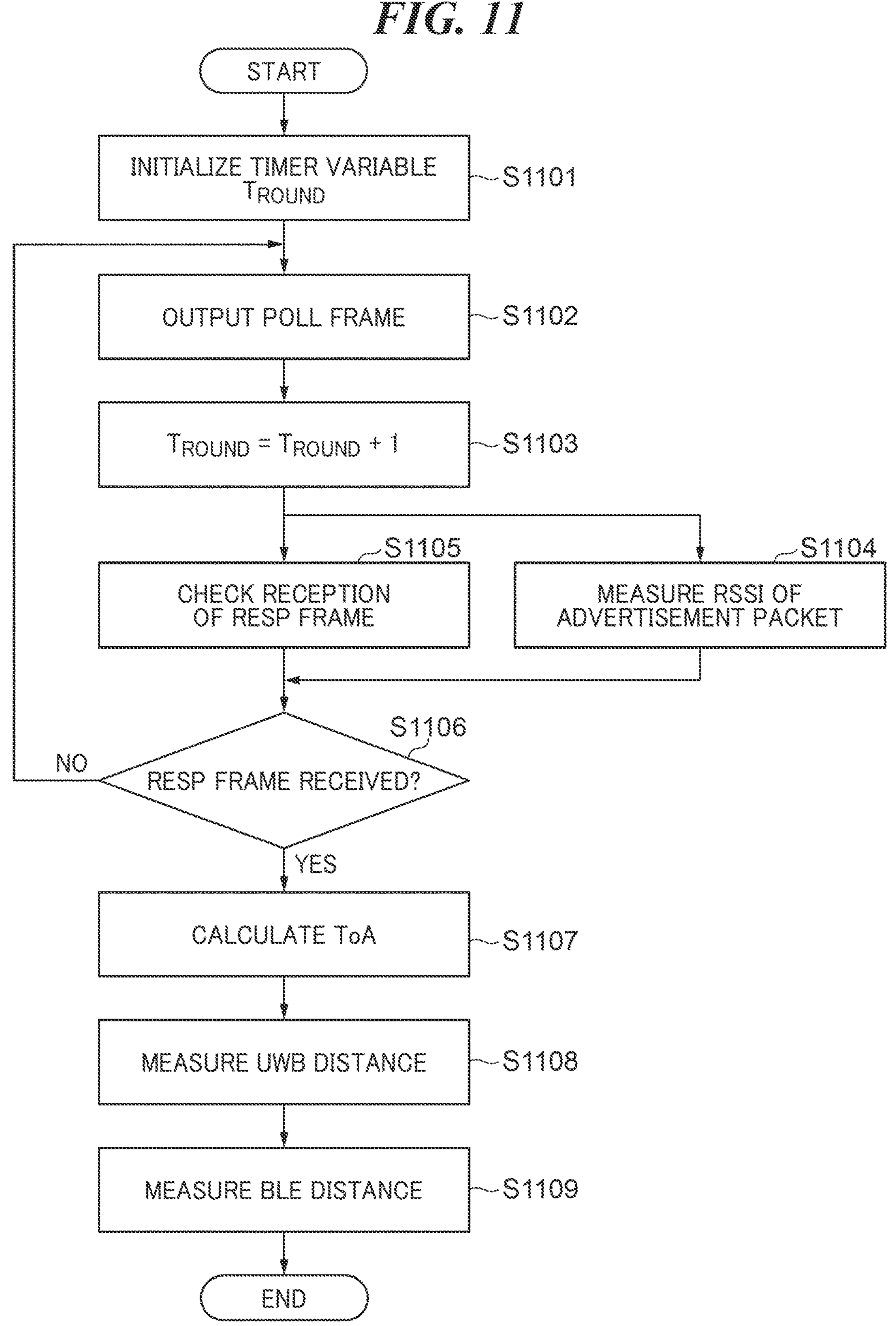
FIG. 11 is a flowchart showing a procedure of distance measurement control processing in step S905 in FIG. 9.

FIG. 11 is a flowchart showing a procedure of distance measurement control processing in step S905 of FIG. 9. As an example, a case where distance measurement control processing is performed on the image forming apparatus A, among the image forming apparatus A, the image forming apparatus B, and the image forming apparatus C will be described. As described above, the advertisement packets 301 are output from the image forming apparatus A at regular intervals.

In FIG. 11, first, the CPU 102 initializes the timer variable $T_{ROUND}$ prepared in the RAM 104 to "0" (step S1101). The timer variable $T_{ROUND}$ is a variable used for measuring the time for the distance measurement device 101. Next, the CPU 102 outputs the POLL frame to the image forming apparatus A (step S1102). Next, the CPU 102 increments the timer variable $T_{ROUND}$ correspondingly to the lapse of time (step S1103).

Next, the CPU 102 measures the received signal strength (received signal strength indicator (RSSI)) of the advertisement packet 301 received from the distance measurement target device 201 (step S1104). In parallel with the measurement in step S1104, the CPU 102 checks the reception of the RESP frame for the POLL frame (step S1105). The CPU 102 determines whether or not a RESP frame has been received from the distance measurement target device 201 (step S1106).

In a case where it is determined in step S1106 that the RESP frame has not been received from the distance measurement target device 201, the distance measurement control processing returns to step S1102. As described above, in the present embodiment, by counting up (incrementing) the timer variable $T_{ROUND}$ correspondingly to the lapse of time, the time from when the distance measurement device 101 outputs the POLL frame to the distance measurement target device 201 to when distance measurement device 101 receives the RESP frame from the distance measurement target device 201 is measured.

In a case where it is determined in step S1106 that the RESP frame has been received from the distance measurement target device 201, the distance measurement control processing proceeds to step S1107. In step S1107, the CPU 102 substitutes the value of the timer variable $T_{ROUND}$ and the time $T_{Reply}$ indicated by the required response time information included in the received RESP frame into Formula (1) to calculate ToA. Next, the CPU 102 measures the UWB distance (step S1108). Specifically, the CPU 102 calculates the distance to the distance measurement target device 201 as the UWB distance using the calculated ToA. Next, the CPU 102 measures the BLE distance (step S1109). Specifically, the CPU 102 calculates the distance to the distance measurement target device 201 as the BLE distance using the RSSI measured in step S1104. Thereafter, the distance measurement control processing ends.

Figure 12:
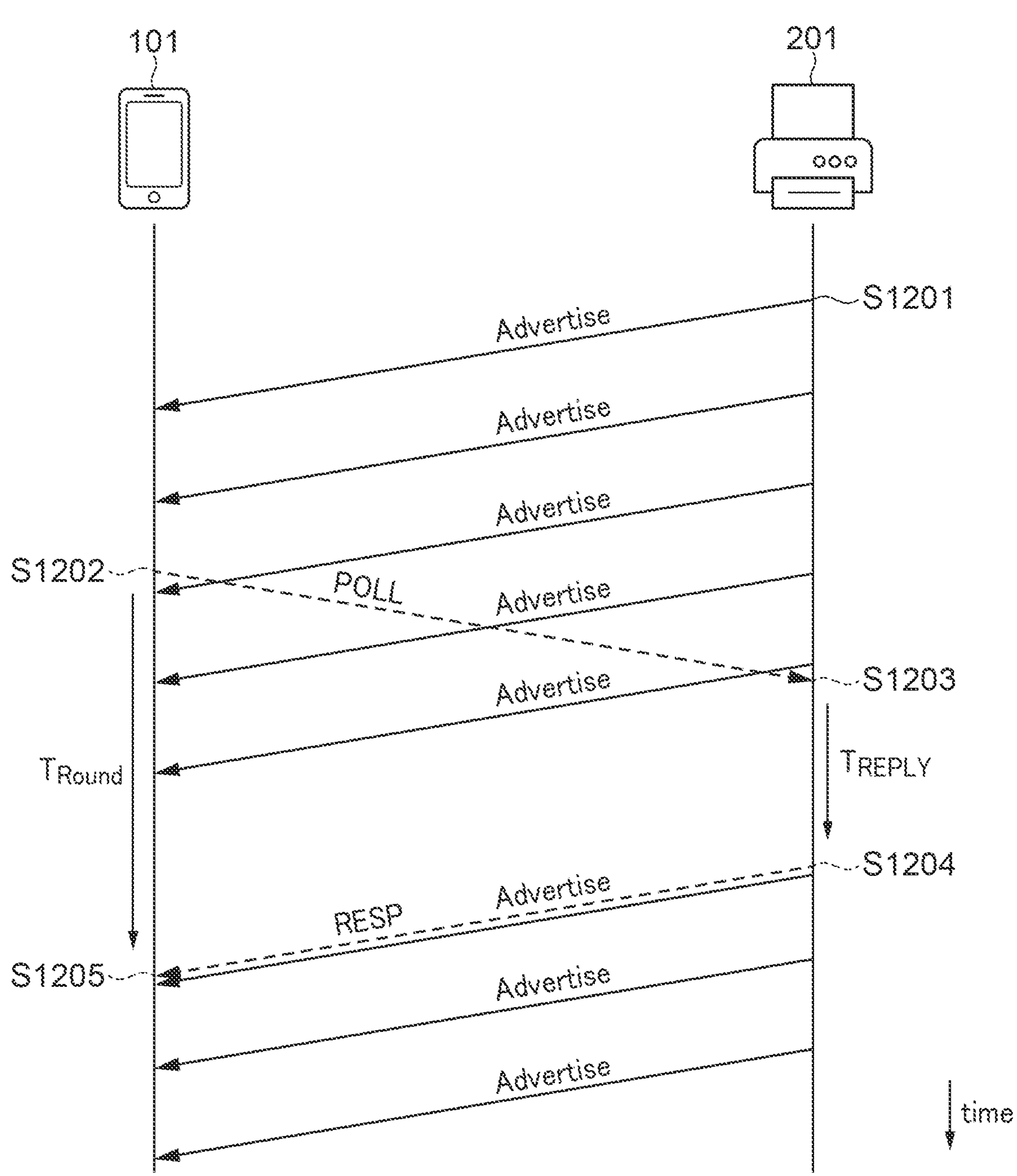
FIG. 12 shows an operation of the distance measurement device in the RESP frame transmission control processing of FIG. 8 and an operation of the distance measurement target device in the distance measurement control processing of FIG. 11 on a time axis.

FIG. 12 shows an operation of the distance measurement device 101 in the RESP frame transmission control processing of FIG. 8 and an operation of the distance measurement target device 201 in the distance measurement control processing of FIG. 11 on a time axis.

In FIG. 12, the distance measurement target device 201 outputs the advertisement packet 301 at regular intervals (step S1201). Under this situation, the distance measurement device 101 outputs a POLL frame for performing distance measurement by UWB, to the distance measurement target device 201 (step S1202). It should be noted that since UWB and BLE are independent from each other, the output of the POLL frame from the distance measurement device 101 is executed at an arbitrary timing.

Upon receiving the POLL frame (step S1203), the distance measurement target device 201 starts preparation for returning the RESP frame and stops outputting the advertisement packet 301 at the same time. Thereafter, when the time $T_{REPLY}$ has elapsed since the reception of the POLL frame, the distance measurement target device 201 outputs the RESP frame to the distance measurement device 101 and resumes the output of the advertisement packet 301 (step S1204).

The distance measurement device 101 measures a distance by distance measurement by UWB and a distance by distance measurement by BLE, respectively (step S1205). In the distance measurement by UWB, the distance measurement device 101 calculates ToA on the basis of the received RESP frame, and calculates the distance to the distance measurement target device 201 using the ToA. In the distance measurement by BLE, the distance measurement device 101 calculates the distance to the distance measurement target device 201 on the basis of the received signal strength (received signal strength indicator (RSSI)) of the advertisement packet 301 received together with the RESP frame.

According to the above-described embodiment, the distance measurement target device 201 stops the output of the advertisement packet 301 in response to the reception of the POLL frame. When the time $T_{REPLY}$ has elapsed since the reception of the POLL frame, the distance measurement target device 201 outputs the RESP frame to the distance measurement device 101 and resumes the output of the advertisement packet 301. The distance measurement device 101 measures a distance to the distance measurement target device 201 by distance measurement by UWB on the basis of the received RESP frame, and measures a distance to the distance measurement target device 201 by distance measurement by BLE on the basis of the received advertisement packet 301. The distance measurement device 101 determines the presence or absence of an obstacle between the distance measurement device 101 and the distance measurement target device 201 based on the UWB distance and the BLE distance. As a result, it is possible to determine the presence or absence of an obstacle between devices while achieving highly accurate distance measurement.

In the above-described embodiment, the distance measurement target device 201 is an image forming apparatus that executes print processing on the basis of print data received from the distance measurement device 101.

Furthermore, in the above-described embodiment, the distance measurement device 101 is a device that transmits print data for causing the distance measurement target device 201 to execute print processing to the distance measurement target device 201. As a result, it is possible to determine the presence or absence of an obstacle between the distance measurement device 101 and the image forming apparatus while accurately measuring the distance to the image forming apparatus that is to be the transmission destination of the print data.

Although the embodiments of the present invention have been described above, the present invention is not limited to the above-described embodiments. For example, among a plurality of distance measurement target devices 201 serving as transmission destination candidates, only the distance measurement target device(s) 201 determined not to have an obstacle between the distance measurement device 101 and the distance measurement target device 201, that is, only the distance measurement target device(s) 201 present on the same floor as the distance measurement device 101 may be displayed on the display 111 in an ascending order of distance to the distance measurement device 101. When such display control is performed, in step S912, instead of adding the determination result on the presence or absence of an obstacle to the list of the distance measurement target devices 201, the information itself for the distance measurement target device 201 determined to have an obstacle between the distance measurement device 101 and the distance measurement target device 201 may be deleted from the list of the distance measurement target devices 201. By performing the display control in this manner, it is possible to display only the transmission destination candidates that can be practically selected, and thus, it is possible to reduce the user effort of considering unnecessary transmission destination candidates as options, for example.

Furthermore, in the present embodiment, a check box for allowing the user to selectably set ON and OFF of a function of narrowing down transmission destination candidates may be displayed on the display 111, and display control for the transmission destination candidates may be performed according to the ON/OFF of the check box. For example, in a case where the user sets this check box to ON, among the distance measurement target devices 201 recorded in the list of the distance measurement target devices 201, only the distance measurement target device(s) 201 determined not to have an obstacle between the distance measurement device 101 and the distance measurement target device 201, that is, only the distance measurement target device(s) 201 present on the same floor as the distance measurement device 101 is(are) displayed as a transmission destination candidate(s). On the other hand, in a case where the user sets this check box to OFF, all the distance measurement target devices 201 recorded in the list of the distance measurement target devices 201 are displayed as transmission destination candidates. Note that, in this case, the fact that there is an obstacle may be notified in association with the distance measurement target device 201 determined to have an obstacle between the distance measurement device 101 and the distance measurement target device 201. As a result, it is possible to reflect the intention of the user in the display of the transmission destination candidate.

Furthermore, in the present embodiment, the reliability of the determination result on the presence or absence of an obstacle may be determined on the basis of a distance obtained by distance measurement by either BLE or UWB, and the display of the transmission destination candidates may be controlled on the basis of this reliability.

Figure 13:
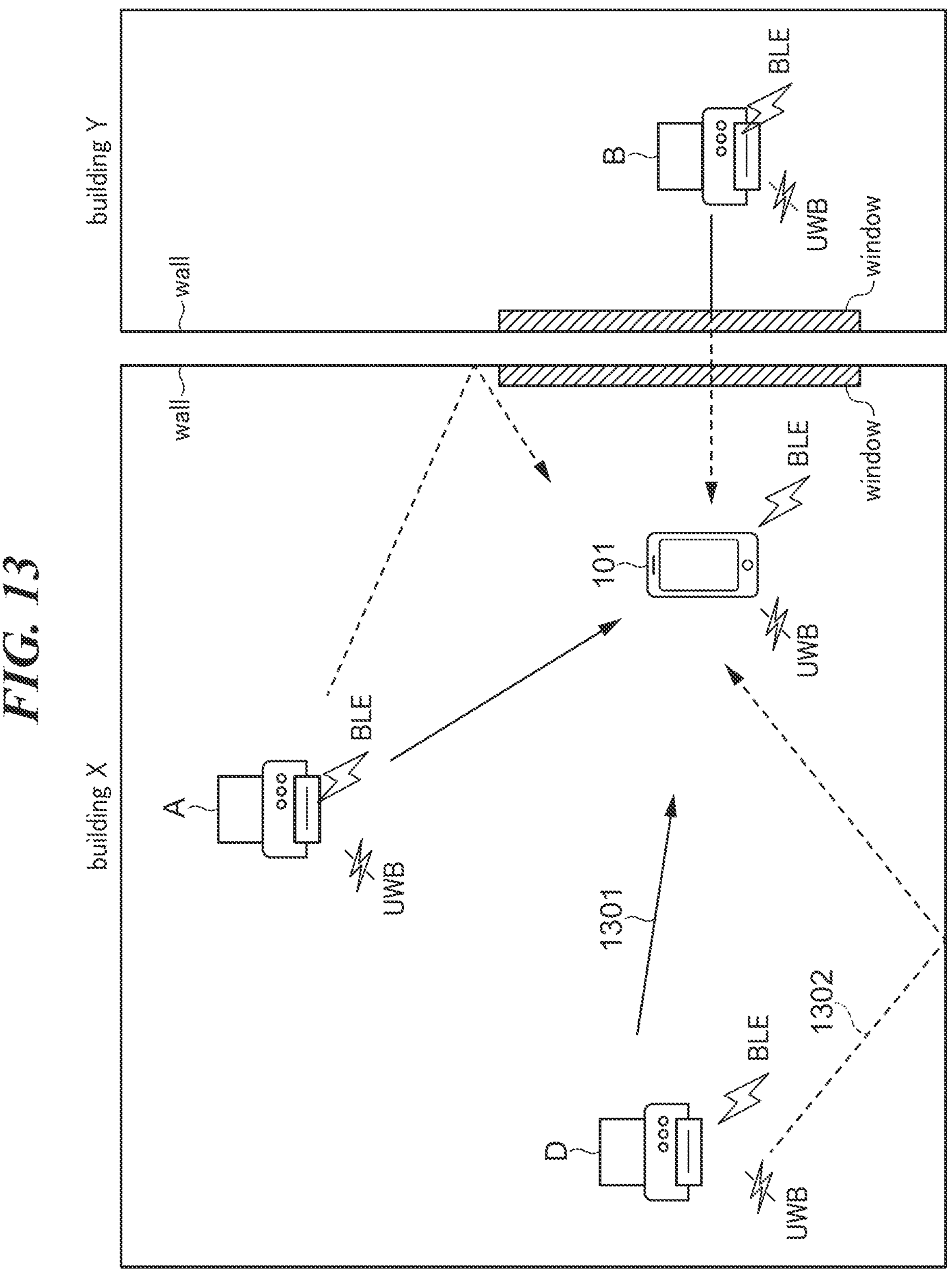
FIG. 13 is a diagram showing an arrangement example of a distance measurement device and a distance measurement target device.

Here, in distance measurement over a long distance, it cannot be said that the radio wave used for distance measurement is a direct wave. This is because, as described above, a scene can be assumed in which the electric field strength of the interference wave is higher than that of the direct wave, and only the interference wave reaches the distance measurement device 101. For example, in the case of an image forming apparatus D (FIG. 13) that is present on the same floor as the distance measurement device 101 but has a certain distance to the distance measurement device 101, there is a case where a direct wave 1301 from the image forming apparatus D does not reach the distance measurement device 101 and only an interference wave 1302 reaches the distance measurement device 101. In such a case, distance measurement is performed using the interference wave 1302. On the other hand, in distance measurement of a short distance, it is very likely that distance measurement is performed using a direct wave.

Therefore, in the present embodiment, in step S912, the CPU 102 additionally determines the reliability of the determination result on the presence or absence of the obstacle based on the UWB distance. For example, with respect to the distance measurement target device 201 (for example, image forming apparatuses A and B (FIG. 13)) for which the UWB distance is equal to or less than a predetermined value, that is, the distance measurement target device 201 in a short distance, it is considered that there is a high possibility that the BLE distance used for the determination of the presence or absence of an obstacle is the distance measurement result by the direct wave, and the reliability of the determination result of the presence or absence of an obstacle is high. Therefore, the CPU 102 determines that the reliability of the determination result on the presence or absence of an obstacle with respect to the distance measurement target device 201 located at a short distance, for which the UWB distance is equal to or less than the predetermined value, is "high". It should be noted that the predetermined value is, for example, a value determined based on the radio wave reachable distance in the BLE.

Figures 14A, 14B:
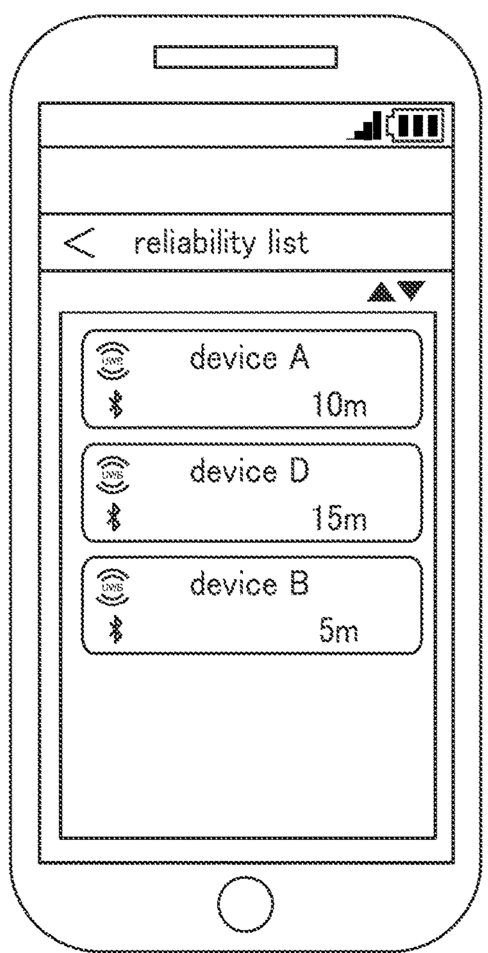
FIGS. 14A and 14B are diagrams for explaining processing of steps S912 and S913 in FIG. 9.

On the other hand, for the distance measurement target device 201 (for example, the image forming apparatus D or the like (FIG. 13)) for which the UWB distance is larger than the predetermined value, that is, the distance measurement target device 201 in a long distance, there is a possibility that the BLE distance used for the determination on the presence or absence of an obstacle is a distance measurement result based on an interference wave instead of a direct wave, and it is considered that the reliability of the determination result on the presence or absence of an obstacle is low. Therefore, the CPU 102 determines that the reliability of the determination result on the presence or absence of an obstacle with respect to the distance measurement target device 201 located at a long distance, for which the UWB distance is larger than the predetermined value, is "low". The CPU 102 adds the determined reliability to the list of the distance measurement target devices 201 for each distance measurement target device 201 as shown in FIG. 14A. In addition, the CPU 102 sets the determination result on the presence or absence of an obstacle to "on hold" for the distance measurement target device 201 determined to have low reliability.

Next, in step S913, the CPU 102 displays the transmission destination candidates on the display 111 as shown in FIG. 14B, on the basis of the list of the distance measurement target devices 201 in FIG. 14A. In FIG. 14B, the image forming apparatus A for which a fact that "there is no obstacle" is indicated with high reliability is displayed at the top of the transmission destination candidates, and the image forming apparatus B for which a fact that "there is an obstacle" is indicated with high reliability is displayed at the bottom of the transmission destination candidates. In addition, the image forming apparatus D for which "on hold" is set as the determination result of the presence or absence of an obstacle is displayed higher than the image forming apparatus B for which the fact that "there is an obstacle" is indicated with high reliability.

By performing such display control, in the display of the transmission destination candidates, the distance measurement target device 201 present on the same floor as the distance measurement device 101 and having a relatively long distance to the distance measurement device 101 can be displayed above the distance measurement target device 201 having an obstacle between the distance measurement device 101 and the distance measurement target device 201.

Note that, in the present embodiment, a mobile terminal such as a smartphone or a tablet has been described as an example of the distance measurement device 101; however, the distance measurement device 101 only needs to be a device having the above-described distance measurement function, and is not limited to the mobile terminal. For example, the distance measurement device 101 may be a personal computer, an image pickup apparatus, an image forming apparatus, or the like.

Furthermore, in the present embodiment, the image forming apparatus has been described as an example of the distance measurement target device 201; however, the distance measurement target device 201 only needs to be an apparatus having a function of transmitting information necessary for distance measurement to the distance measurement device 101 by wireless communication, and is not limited to the image forming apparatus. For example, the distance measurement target device 201 may be a mobile terminal, a personal computer, an image pickup apparatus, or the like.

Furthermore, in the present embodiment, as an example of a configuration to which the present invention is applied, a configuration has been described in which transmission destination candidates of print data are displayed using the UWB distance and the determination result of the presence or absence of an obstacle; however, the present invention is not limited thereto. The configuration to which the present invention is applied only needs to be a configuration which displays a list of devices present in the vicinity of the distance measurement device 101.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-029402, filed Feb. 28, 2023, which is hereby incorporated by reference wherein in its entirety.

What is claimed is:

1. An image forming apparatus that executes print processing based on print data received from a mobile terminal, the image forming apparatus comprising:

at least one memory storing instructions; and at least one processor that executes the instructions to:

transmit, at a constant interval, an advertisement packet including information for performing a first distance measurement by the mobile terminal using a signal strength of radio waves, to measure a first distance between the image forming apparatus and the mobile terminal;

receive, from the mobile terminal, an inquiry wave for performing a second distance measurement by the mobile terminal using a time of arrival of radio waves, to measure a second distance between the image forming apparatus and the mobile terminal;

stop transmitting the advertisement packet in accordance with reception of the inquiry wave;

after a predetermined time has elapsed since receiving the inquiry wave, transmit to the mobile terminal a response wave to be used for the second distance measurement; and resume transmitting the advertisement packet at the constant interval after transmitting the response wave, wherein a difference between the first distance and the second distance measured by the mobile terminal enables the mobile terminal to determine presence or absence of an obstacle between the mobile terminal and the image forming apparatus, wherein:

in a case where a difference between the first and second distances exists, the obstacle is determined to be present; and in a case where no difference between the first and second distances exists, the obstacle is determined to be absent.

2. A mobile terminal that measures a distance to an image forming apparatus, which transmits, at a constant interval, an advertisement packet, the mobile terminal comprising:

at least one memory storing instructions; and at least one processor that executes the instructions to:

receive, from the image forming apparatus at the constant interval, the advertisement packet, which includes information for performing a first distance measurement using a signal strength of received radio waves, to measure a first distance between the image forming apparatus and the mobile terminal;

transmit, to the image forming apparatus, an inquiry wave for performing a second distance measurement using a time of arrival of radio waves, to measure a second distance between the image forming apparatus and the mobile terminal;

receive, from the image forming apparatus, a response wave to be used for the second distance measurement;

cause the image forming apparatus to stop outputting the advertisement packet in accordance with reception of the inquiry wave by the image forming apparatus;

perform the second distance measurement to measure the second distance using the response wave received from the image forming apparatus;

perform the first distance measurement to measure the first distance using the advertisement packet received from the image forming apparatus together with the received response wave; and determine presence or absence of an obstacle between the mobile terminal and the image forming apparatus based on a difference between the second distance and the first distance, wherein:

in a case where a difference between the first and second distances exists, the obstacle is determined to be present; and in a case where no difference between the first and second distances exists, the obstacle is determined to be absent.

3. The mobile terminal according to claim 2, wherein the mobile terminal is configured to transmit print data to the image forming apparatus to execute print processing.

4. The mobile terminal according to claim 2, further comprising:

a display, wherein the at least one processor further executes instructions to:

perform the first distance measurement and the second distance measurement for each of a plurality of image forming apparatuses;

determine presence or absence of an obstacle between the mobile terminal and each of the plurality of image forming apparatuses;

cause the display to display a list of the plurality of image forming apparatuses based on the second distance measured by the second distance measurement and a result of the determination for each of the plurality of image forming apparatuses, in ascending order of distance from the mobile terminal, wherein the display is caused to display one image forming apparatus, among the plurality of image forming apparatuses, where the obstacle is determined to be present between the mobile terminal and the one image forming apparatus, in an unselectable manner.

5. The mobile terminal according to claim 3, further comprising:

a display, wherein the at least one processor further executes the instructions to:

perform the first distance measurement and the second distance measurement for each of a plurality of image forming apparatuses;

determine presence or absence of an obstacle between the mobile terminal and each of the plurality of image forming apparatuses;

cause the display to display a list of the plurality of image forming apparatuses based on the second distance measured by the second distance measurement and a result of the determination for each of the plurality of image forming apparatuses; and cause the display to display first image forming apparatuses, among the plurality of image forming apparatuses, where the obstacle is determined to be absent between the mobile terminal and the first image forming apparatuses, in ascending order of distance from the mobile terminal.

6. The mobile terminal according to claim 4, wherein the at least one processor further executes the instructions to cause a user to selectably set ON/OFF of a function of narrowing down transmission destination candidates of the print data.

7. The mobile terminal according to claim 2, wherein reliability of a result of the determination is determined on the basis of the distance measured by the second distance measurement.

8. A control method for an image forming apparatus that executes print processing based on print data received from a mobile terminal, the control method comprising:

transmitting, at a constant interval, an advertisement packet including information for performing a first distance measurement by the mobile terminal using a signal strength of radio waves, to measure a first distance between the image forming apparatus and the mobile terminal;

receiving, from the mobile terminal, an inquiry wave for performing a second distance measurement by the mobile terminal using a time of arrival of radio waves for measuring a second distance between the image forming apparatus and the mobile terminal;

stopping transmitting the advertisement packet in accordance with reception of the inquiry wave;

after a predetermined time has elapsed since the reception of the inquiry wave, transmitting to the mobile terminal a response wave to be used for the second distance measurement; and resuming transmitting the advertisement packet at the constant interval after transmitting the response wave, wherein the first distance and the second distance measured by the mobile terminal allows the mobile terminal to determine presence or absence of an obstacle between the mobile terminal and the image forming apparatus, wherein:

in a case where a difference between the first and second distances exists, the obstacle is determined to be present; and in a case where no difference between the first and second distances exists, the obstacle is determined to be absent.

9. A system that measures a distance from a mobile terminal to an image forming apparatus, the system comprising:

the image forming apparatus, which comprises at least one first memory storing instructions, and at least one first processor that executes the instructions to:

transmit, at a constant interval, an advertisement packet including information for performing a first distance measurement by the mobile terminal using a signal strength of radio waves, to measure a first distance between the image forming apparatus and the mobile terminal;

receive, from the mobile terminal, an inquiry wave to be used by the mobile terminal for performing second distance measurement using a time of arrival of radio waves, to measure a second distance between the image forming apparatus and the mobile terminal;

stop transmitting the advertisement packet in accordance with reception of the inquiry wave; and after a predetermined time has elapsed since receiving the inquiry wave, transmit to the mobile terminal a response wave to be used for the second distance measurement; and resume transmitting the advertisement packet at the constant interval after transmitting the response wave; and the mobile terminal, which comprises at least one second memory storing instructions and at least one second processor that executes the instructions to:

receive, from the image forming apparatus at the constant interval, the advertisement packet, which includes information for performing the first distance measurement using the signal strength of radio waves;

transmit, to the image forming apparatus, the inquiry wave for performing the second distance measurement using the time of arrival of radio waves;

receive, from the image forming apparatus, the response wave;

cause the image forming apparatus to stop transmitting the advertisement packet in accordance with reception of the inquiry wave by the image forming apparatus;

after the predetermined time has elapsed since the image forming apparatus received the inquiry wave, cause the image forming apparatus to transmit the response wave and to thereafter resume transmitting the advertisement packet at the constant interval;

perform the second distance measurement to measure the second distance using the response wave received from the image forming apparatus;

perform the first distance measurement to measure the first distance using the advertisement packet together with the received response wave; and determine presence or absence of an obstacle between the mobile terminal and the image forming apparatus based on a difference between the second distance and the first distance, wherein:

in a case where a difference between the first and second distances exists, the obstacle is determined to be present; and in a case where no difference between the first and second distances exists, the obstacle is determined to be absent.

* * * * *